(12) United States Patent
Lee et al.

(10) Patent No.: US 6,576,318 B2
(45) Date of Patent: Jun. 10, 2003

(54) METHOD TO FABRICATE SMOOTH-SURFACED CRYSTALLINE PHASE-CHANGE LAYER FOR ATOMIC RESOLUTION STORAGE DEVICE

(75) Inventors: Heon Lee, Sunnyvale, CA (US); Robert Bicknell-Tassius, Springfield, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 51 days.

(21) Appl. No.: 09/873,189

(22) Filed: Jun. 5, 2001

(65) Prior Publication Data

US 2002/0182363 A1 Dec. 5, 2002

(51) Int. Cl.⁷ .................................................. B32B 3/02
(52) U.S. Cl. ..................... 428/64.1; 428/64.5; 428/64.6; 430/270.13
(58) Field of Search ................................ 428/64.1, 64.4, 428/64.5, 64.6, 913; 430/270.13, 495.1, 945; 369/283, 288

(56) References Cited

U.S. PATENT DOCUMENTS

| 5,557,596 A | 9/1996 | Gibson et al. .............. 369/101 |
| 2001/0040860 A1 * | 11/2001 | Kondo .................... 369/275.2 |

* cited by examiner

Primary Examiner—Elizabeth Mulvaney

(57) ABSTRACT

A method of forming a crystalline, phase-change layer that remains atomically smooth on its surface. Also, an atomically smooth, crystalline, phase-change layer made according to this method. The method can include forming a phase-change layer over a substrate, forming a thick capping layer over the phase-change layer, changing the phase-change layer from an amorphous phase to a crystalline phase, removing the thick capping layer, and forming a thin capping layer over the phase-change layer.

20 Claims, 4 Drawing Sheets

METHOD TO FABRICATE SMOOTH-SURFACED CRYSTALLINE PHASE-CHANGE LAYER FOR ATOMIC RESOLUTION STORAGE DEVICE

BACKGROUND OF THE INVENTION

1. Field of the Invention

The present invention relates generally to data storage media and methods of manufacturing data storage media.

2. Description of the Related Art

FIG. 1 illustrates an ultra-high-density data storage device 10 according to the related art. The data storage device 10 is made up of a storage medium 20 and a tip wafer 30 positioned proximate to one surface of the storage medium 20. The storage medium 20 contains nanometer-scaled data bits 40 that are written to and read from the storage medium 20 by emitters 50 located on the surface of the tip wafer 30 closest to the storage medium 20. The writing and reading operations will be discussed below.

The emitters 50 bombard the data bits 40 with electron beams that are focused to nanometer-scaled spots. If the beams are of sufficiently high energy, the bombarded data bits 40 experience a phase change (e.g., between a crystalline and amorphous state). Effecting such a phase change constitutes writing to the storage medium 20.

In the data storage device 10 illustrated in FIG. 1, a number of nanometer-scaled data bits 40 are contained within the storage medium 20. If these data bits 40 have been written to by any of the emitters 50 as discussed above, they can be considered as data bits 40 that represent the number "1". On the other hand, the data bits 40 that have not been written to can be considered to be data bits 40 that represent the number "0".

Whether a data bit 40 represents a "1" or a "0" can be determined by bombarding the data bit 40 in question with a lower energy beam than is used in the writing operation and monitoring the interactions of the beam with the data bits 40. Performing such steps is known as "reading" from the storage medium 20.

An example of a reading operation includes bombarding the data bits 40 of the storage medium 20 with a low-energy electron beam that would not effectuate a phase change of the data bits 40 being bombarded. This exemplary reading operation also includes monitoring how the low-energy bombarding electrons interact with the data bit 40. When a crystalline data bit 40 gets bombarded, a different number of electron-hole pairs are generated than when the low-energy electron beam bombards an amorphous data bit 40. Hence, by monitoring the number of generated electron-hole pairs, it becomes possible to determine whether a data bit 40 represents a "1" or a "0".

FIG. 2 illustrates a close-up view of the related art storage medium 20 used in the data storage device 10 illustrated in FIG. 1. According to FIG. 2, the storage medium 20 is made up of a substrate 60 and of a crystalline phase-change layer 70 formed on one surface of the substrate 60. Although not illustrated, the data bits 40 discussed above are written to and read from the crystalline, phase-change layer 70.

FIG. 2 shows that the surface of the crystalline phase-change layer 70 furthest from the substrate 60 contains a high degree of surface roughness. Typically, the surface roughness exceeds 4.0 nanometer root-mean-square (RMS). Among other drawbacks, a surface roughness of this magnitude makes it difficult to form data bits 40 that are of a consistent size and therefore limits the resolution of the data storage device 10.

According to the related art method of forming the crystalline phase-change layer 70 illustrated in FIG. 2, high-temperature deposition methods are used. However, under high-temperature conditions (e.g., about 300 degrees Celsius), the crystalline phase-change layer 70 formed on the substrate 60 develops the relatively rough surface illustrated in FIG. 2 and can have a granular surface morphology that is disfavored for ultra-high-density storage devices 10.

Surface roughness is disfavored at least because it causes the data bits 40 to vary in geometry and can lead to added signal noise when reading from the storage medium 20. Further, the high-temperature deposition of the crystalline phase-change layer 70 according to the related art can lead to the loss of volatile group VI elements such as selenium and tolerium (Se, Te) that are typically used in the storage medium 20.

BRIEF SUMMARY OF THE INVENTION

According to one embodiment, a method of fabricating a data storage medium that includes forming a phase-change layer over a substrate, forming a thick capping layer over the phase-change layer, changing the phase-change layer from a first phase to a second phase, removing the thick capping layer, and forming a thin capping layer over the phase-change layer.

According to another embodiment, a data storage medium that includes a substrate, a phase-change layer positioned over the substrate, and a thin capping layer positioned over the phase-change layer, wherein a first surface of the phase-change layer is positioned closest to the thin capping layer and wherein the first surface of the phase-change layer has a root mean square (rms) surface roughness of less than 2 nanometers.

BRIEF DESCRIPTION OF THE DRAWINGS

The invention will be described by way of example, in the description of exemplary embodiments, with particular reference to the accompanying drawings in which.

DETAILED DESCRIPTION OF THE INVENTION

FIGS. 3A through 3E illustrate a method of forming a smooth-surfaced storage medium 20 according to one embodiment of the present invention. The storage medium 20 illustrated in FIG. 3E includes an atomically smooth surface and is not susceptible to sustaining a loss of the volatile group VI elements that are commonly used in phase-change materials.

Figure 1:
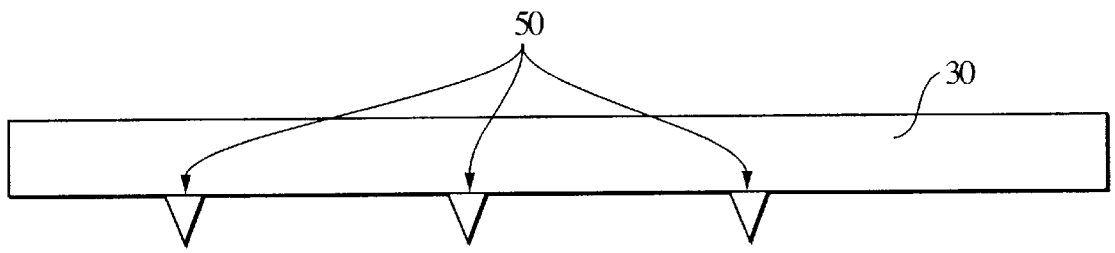
FIG. 1 illustrates a cross-sectional view of an ultra-high density data storage device according to the related art.
Figure 1:
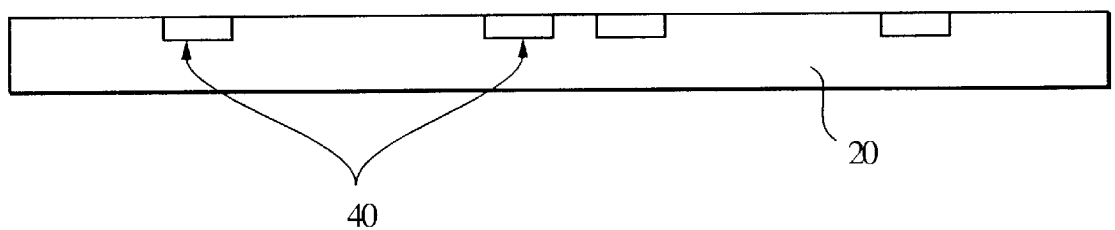
Figure 2:
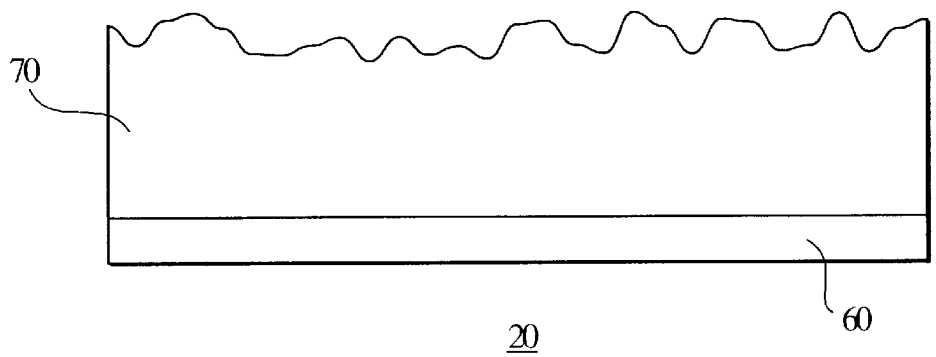
FIG. 2 illustrates a close-up view of the storage medium of an ultra-high density data storage device according to the related art.
Figure 3:
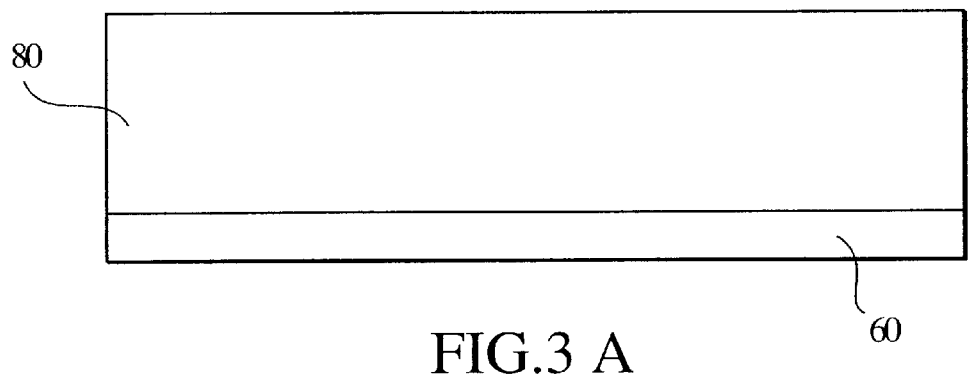
FIG. 3A illustrates a step of the manufacturing method of the present invention wherein an amorphous phase-change layer is formed on a substrate.
FIG. 3B illustrates a step of a manufacturing method of the present invention wherein a thick capping layer is formed on the amorphous phase-change layer.
FIG. 3C illustrates a step of a manufacturing method of the present invention wherein a crystalline phase-change layer is formed between the substrate and the thick capping layer.
FIG. 3D illustrates a step of a manufacturing method of the present invention wherein only the crystalline phase-change layer is present above the substrate.
FIG. 3E illustrates a step of a manufacturing method of the present invention wherein a thin capping layer is formed above the crystalline phase-change layer.
Figure 3:
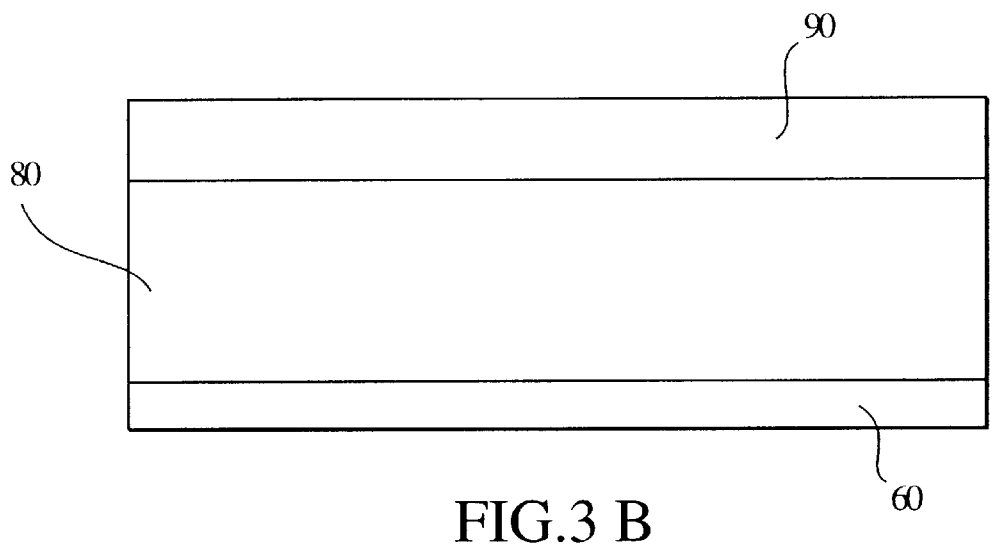
Figure 3:
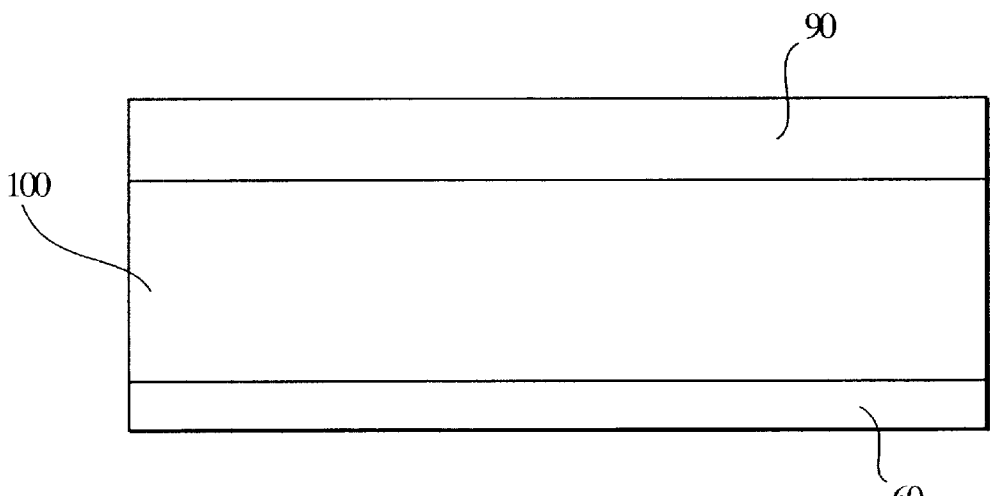
Figure 3:
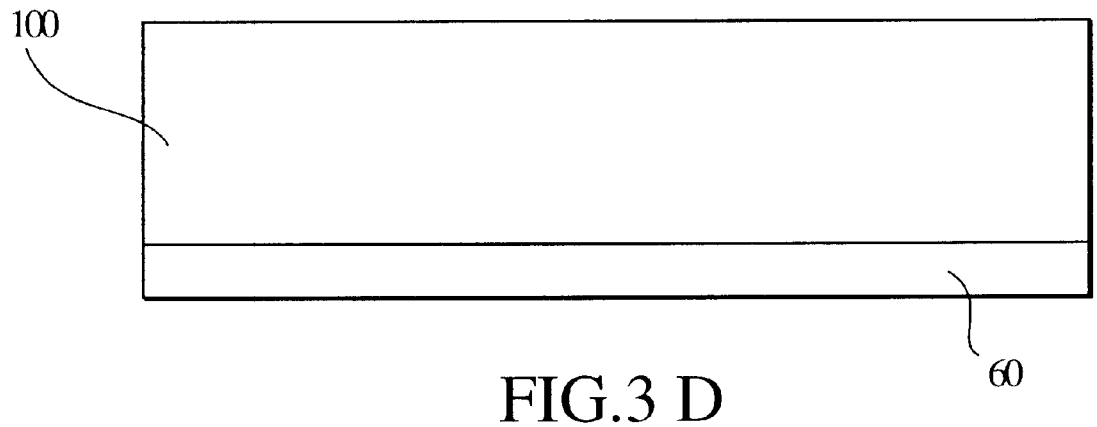
Figure 3:
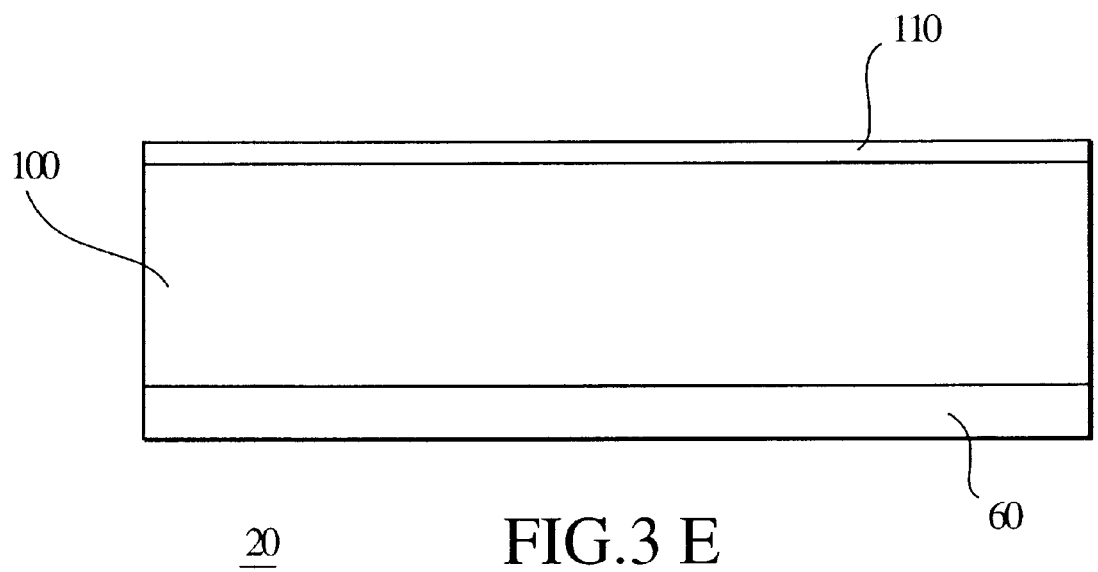

According to FIG. 3A, an amorphous phase-change layer 80 is deposited at room temperature onto a substrate 60. The amorphous phase-change layer 80 can be deposited by thermal evaporation, e-beam evaporation, elemental co-evaporation and/or radio frequency (RF) sputtering. The amorphous phase-change layer 80 can also be deposited by any other method that forms an atomically smooth surface.

The amorphous phase-change layer 80 can include any material that is capable of containing the nanometer-scaled data bits 40 discussed above. These data bits 40 are written to and read from the storage medium 20 by the electron beams from the emitters 50 as previously discussed.

The substrate 60 can be made from almost any material. However, according to certain embodiments of the present invention, preferred materials include those that can be deposited as atomically smooth layers and/or those that are amenable to semiconductor micro-processing. According to certain embodiments, the substrate 60 is also chosen to be a material that is resistant to the chemical etches that will be discussed below.

Typically, the amorphous phase-change layer 80 is deposited as a layer having a thickness between approximately 1,000 and 3,000 angstroms. Preferably, the amorphous phase-change layer 80 is between approximately 1,000 and 1,500 angstroms thick. (The thicknesses of the layers discussed in connection with embodiments of the present invention are approximate and any thicknesses within 10 percent of the thicknesses discussed herein, or other suitable thicknesses, are also within the scope of the present invention.) The only thickness limitations of the amorphous phase-change layer 80 are that the layer must be thick enough to allow readable data bits 40 to be formed therein and the amorphous phase-change layer 80 must not be so thick that internal stresses will cause it to crack during or after deposition.

FIG. 3B illustrates another step of a manufacturing method according to an embodiment of the present invention wherein a thick capping layer 90 is formed on the surface of the amorphous phase-change layer 80 furthest away from substrate 60. The thickness of the thick capping layer 90 is typically between 1,000 and 2,000 angstroms, although no particular upper boundary to the thickness exists, so long as neither the thick capping layer 90 nor amorphous phase-change layer 80 layer cracks during the manufacturing process. No lower boundary for the thickness of the thick capping layer 90 exists either, so long as the thick capping layer 90 remains thick enough to prevent the surface of the amorphous phase-change layer 80 layer closest to the thick capping layer 90 from experiencing changes to its surface morphology during the remainder of the steps of the manufacturing method.

The thick capping layer 90 can be any material that can be selectively etched relative to the crystalline phase-change layer 100 (into which the amorphous phase-change layer 80 is eventually transformed, as discussed below) and substrate 60. Typical materials that make up the thick capping layer 90 include, but are not limited to, silica ($SiO_2$), borosilicate glass (BSG), phosphosilicate glass (PSG) and borophosphosilicate glass (BPSG). The thick capping layer 90 is typically deposited by either RF sputtering or e-beam evaporation. However, these methods are not limiting of the present invention and any method that forms the thick capping layer 90 without substantially disturbing the atomically smooth surface of the amorphous phase-change layer 80 are also within the scope of the present invention.

FIG. 3C illustrates another step of a manufacturing process according to an embodiment of the present invention wherein the amorphous phase-change layer 80 has been transformed into a crystalline phase-change layer 100. Although any process capable of effecting the change from an amorphous phase-change layer 80 to a crystalline phase-change layer 100 is within the scope of the present invention. In a preferred embodiment, annealing is used to effectuate the change. Typical annealing times and temperatures are dependent of the phase-change material used. However, typical annealing temperatures are preferably chosen with respect to the crystallization temperatures of the material being annealed. According to certain embodiments of the present invention, the crystallization temperature is between approximately 200 and 300 degrees Celsius, and the annealing temperature can be chosen in that range.

FIG. 3D illustrates another manufacturing step according to an embodiment of the present invention. According to FIG. 3D, the thick capping layer 90 has been removed from the surface of the crystalline phase-change layer 100 upon which it had previously been deposited.

According to certain embodiments of the present invention, the thick capping layer 90 is selectively etched by an HF solution or vapor and/or fluorine-based dry etch. In other words, either a wet etch or a vapor etch can be used, although the methods of removing the thick capping layer 90 are not limited to wet and vapor etching. Any processes by which the thick capping layer 90 may be removed from the surface of the crystalline phase-change layer 100 without substantially changing the surface morphology of the crystalline phase-change layer 100 are also within the scope of the present invention. Typically, HF etches have an HF-to-water ratio of between 1:10 and 1:100, although these ratios are exemplary only and other ratios may be used. Also, other buffered oxide etches (BOE) can be used.

FIG. 3E illustrates yet another step of a manufacturing process according to the present invention wherein a thin capping layer 110 is formed on the surface of the crystalline phase-change layer 100 furthest from the substrate 60. The thickness of the thin capping layer 110 is typically between three and seven nanometers, although other thicknesses are also within the scope of the present invention. The maximum thickness of the thin capping layer 110 is determined by the amount of energy that is to be emitted by the energy emitters 50 when conducting read and write operations to the storage medium 20. More specifically, because the thin capping layer 110 absorbs more energy as it gets thicker, the energy emitted by the energy emitters 50 will only traverse a certain amount of thickness of thin capping layer 110, requiring that the thin capping layer 110 remain thin.

In an alternate embodiment of the present invention wherein the energy emitters 50 emit a type of energy (e.g., light) that is capable of penetrating large thicknesses of clear thin capping layers 110, the thickness of the thin capping layer 110 can be greatly increased.

The thin capping layer 110 is typically made from a low-atomic-density, durable material. This means that low-atomic-density atoms, such as aluminum and boron, can be used. Such low-atomic-density materials allow electrons from the emitters 50 to travel through a greater thickness of the thin capping layer 110. With regard to the durability aspect of the materials used in the thin capping layer 110, this mainly refers to a material's ability to resist wear and physical damage.

Typical materials that make up the thin capping layer 110 include, but are not limited to, alumina ($Al_2O_3$) and boron nitride. Typically, the thin capping layer 110 is deposited via RF sputtering or atomic layer deposition (ALD). However, the methods of forming the thin capping layer 110 are only limited by the methods that are capable of maintaining a low surface roughness of the thin capping layer 110, consistent with creating a smooth surface, and that do not substantially alter the surface characteristics of the crystalline phase-change layer 100 upon which the thin capping layer 110 is deposited.

Typical surface roughnesses for the thin capping layer 110 are of less than 2.0 nanometers RMS. However, according to a preferred embodiment of the present invention, the surface roughness of the thin capping layer 110 is less than 0.4 nanometers RMS.

The storage medium 20 configuration illustrated in FIG. 3E has a crystalline phase-change layer 100 and a thin capping layer 110 that are atomically smooth and that can be placed in proximity to the emitters 50 discussed above. The thin capping layer 110 protects the surface morphology of the crystalline phase-change layer 100 and allows for the reading and writing of the data bits 40 to be performed at higher temperatures or emitter 50 energies. Further, according to the embodiment of the present invention illustrated in FIG. 3E, volatilization of group VI elements from the crystalline phase-change layer 100 is either significantly reduced or completely eliminated.

Figure 4:
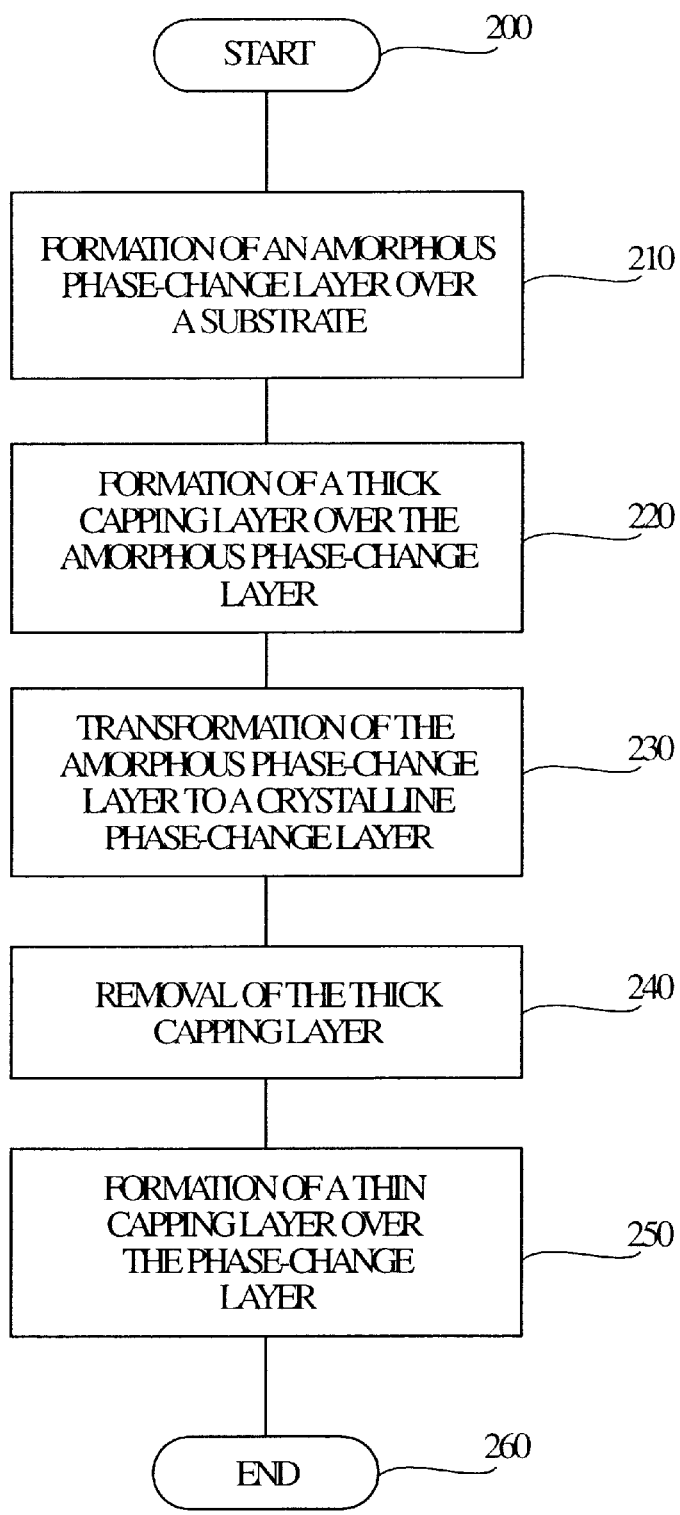
FIG. 4 is a flowchart illustrating the various steps of a manufacturing method consistent with the present invention.

FIG. 4 is a flowchart of the manufacturing steps described above. As illustrated in FIG. 4, the manufacturing process is initiated in a start step 200. Then, step 210, which calls for the formation of an amorphous phase-change layer over a substrate, may be included. This step is illustrated in FIG. 3A. Step 220, calling for the formation of a thick capping layer over the amorphous phase-change layer, may then follow and is illustrated in FIG. 3B. At that point, step 230, which calls for the transformation of the amorphous phase-change layer to a crystalline phase-change layer, can be included, as shown in FIG. 3C. Step 230 can be followed by step 240, a step that calls for the removal of the thick capping layer, as illustrated in FIG. 3D. Step 250, illustrated in FIG. 3E, can then be included to effectuate the formation of a thin capping layer over the crystalline phase-change layer. Step 260 can then end the manufacturing process.

The foregoing detailed description has been given for understanding exemplary implementations of the invention only and no unnecessary limitations should be understood therefrom as modifications will be obvious to those skilled in the art without departing from the scope of the appended claims and their equivalents.

What is claimed is:

1. A method of fabricating a data storage medium comprising:
    forming a phase-change layer over a substrate;
    forming a thick capping layer over the phase-change layer;
    changing the phase-change layer from a first phase to a second phase;
    removing the thick capping layer; and
    forming a thin capping layer over the phase-change layer.

2. The method of claim 1, wherein the forming the phase-change layer step comprises performing at least one of thermal evaporation, e-beam evaporation, elemental co-evaporation, and radio frequency (RF) sputtering.

3. The method of claim 1, wherein the forming the phase-change layer step comprises forming the phase-change layer comprising at least one of an In—Se compound, an In—Se—Te compound and a II–VI compound.

4. The method of claim 1, wherein the forming the phase-change layer step comprises forming the phase-change layer to be between 1000 and 3000 angstroms thick.

5. The method of claim 1, wherein the forming the thick capping layer step comprises forming the thick capping layer to be of a thickness between 1000 and 1500 angstroms.

6. The method of claim 1, wherein the wherein the forming the thick capping layer step comprises forming the thick capping layer to include at least one of silica ($SiO_2$), borosilicate glass (BSG), phosphosilicate glass (PSG), and borophosphosilicate glass (BPSG).

7. The method of claim 1, wherein the forming the thick capping layer step comprises performing at least one of RF sputtering and e-beam evaporation.

8. The method of claim 1, wherein the removing step comprises selectively etching the thick capping layer.

9. The method of claim 1, wherein the removing step comprises at least one of a selective wet etching and a selective vapor etching.

10. The method of claim 1, wherein the forming the thin capping layer step comprises at least one of RF sputtering and atomic layer deposition (ALD).

11. The method of claim 1, wherein the forming the thin capping layer step comprises forming the thin capping layer to be between 3 and 7 nanometers thick.

12. A data storage medium comprising:
    a substrate;
    a phase-change layer positioned over the substrate; and
    a thin capping layer positioned over the phase-change layer, the thin capping layer having a thickness of between 3 and 7 nanometers,
    wherein a first surface of the phase-change layer is positioned closest to the thin capping layer and wherein the first surface of the phase-change layer has a root mean square (rms) surface roughness of less than 2 nanometers.

13. The data storage medium of claim 12, wherein the phase-change layer comprises a crystalline region.

14. The data storage medium of claim 13, wherein the phase-change layer comprises a nanometer-scaled data bit.

15. The data storage medium of claim 13, wherein the phase-change layer comprises at least one of an In—Se compound, an In—Se—Te compound, and a II–VI compound.

16. The data storage medium of claim 13, wherein the phase-change layer comprises a layer having a thickness between 1000 and 3000 angstroms.

17. The data storage medium of claim 13, wherein the thin capping layer comprises a low-atomic-density, durable material.

18. The data storage medium of claim 17, wherein the thin capping layer comprises at least one of alumina ($Al_2O_3$) and boron nitride.

19. The data storage medium of claim 13, wherein the first surface has a root-mean-square surface roughness of less than 0.4 nanometers.

20. A data storage medium comprising:

a substrate;

a phase-change layer positioned over the substrate; and a thin capping layer positioned over the phase-change layer, wherein the thin capping layer comprises at least one of alumina ($Al_2O_3$) and boron nitride, wherein a first surface of the phase-change layer is positioned closest to the thin capping layer and wherein the first surface of the phase-change layer has a root mean square (rms) surface roughness of less than 2 nanometers.

* * * * *